United States Patent [19]

Tomkins et al.

[11] Patent Number: 5,464,036
[45] Date of Patent: Nov. 7, 1995

[54] ORIFICE FITTING WITH VENTING PASSAGE AND INJECTION SEAL

[75] Inventors: Murray R. Tomkins, Ardrossan; Andrew J. Patterson, Edmonton, both of Canada

[73] Assignee: Valgro, Ltd., Edmonton, Canada

[21] Appl. No.: 193,934

[22] Filed: Feb. 9, 1994

[51] Int. Cl.⁶ .................................. F15D 1/08; G01F 1/42
[52] U.S. Cl. ...................... 137/315; 73/861.61; 138/44; 138/94.3
[58] Field of Search ................ 73/861.61, 861.62; 137/315; 138/94, 94.3, 44; 251/174, 176, 193, 195, 196, 205, 210; 277/12, 138, 141, 142, 164

[56] References Cited

U.S. PATENT DOCUMENTS

| | | | |
|---|---|---|---|
| 2,954,044 | 9/1960 | Volpin | 251/327 |
| 3,078,865 | 2/1963 | Estes | 137/246.22 |
| 3,198,483 | 8/1965 | Anderson | 251/327 |
| 3,575,431 | 2/1971 | Bryant | 251/327 |
| 3,760,833 | 9/1973 | Kemp et al. | 137/246.22 |
| 3,883,112 | 5/1975 | Milleville | 137/246.22 |
| 3,981,066 | 9/1976 | Calvert | 29/451 |
| 4,192,483 | 3/1980 | Combes | 251/172 |
| 4,337,919 | 7/1982 | Ripert | 251/304 |
| 4,370,893 | 2/1983 | Combes | 73/861.61 |
| 4,380,936 | 4/1983 | Van Scoy | 73/861.62 |
| 4,394,826 | 7/1983 | Van Scoy | 138/94.3 |
| 4,399,708 | 8/1983 | Van Scoy | 138/94.3 |
| 4,410,010 | 10/1983 | Van Scoy | 138/44 |
| 4,425,806 | 1/1984 | Van Scoy | 73/861.61 |
| 4,476,730 | 10/1984 | Brumm | 138/94 |
| 4,593,915 | 7/1986 | Seger et al. | 138/44 |

*Primary Examiner*—George L. Walton
*Attorney, Agent, or Firm*—Workman Nydegger Seeley

[57] ABSTRACT

An orifice fitting for measuring the flow of gas through a pipeline in which the orifice fitting has a body including a pair of opposing body plates that define a body chamber. Passing through both body plates is an aligned flow passage for attachment to a gas pipeline. One of the body plates includes an access opening that is selectively covered and sealed by a hatch. A carrier having a carrier chamber is movably positioned within the body chamber so that the carrier chamber can be selectively aligned with the flow passage or the access opening. Removably positioned within the carrier chamber is an orifice disk having an orifice of a predetermined size through which gas can flow when the carrier chamber is aligned with the flow passage. The carrier chamber is sealed from the body chamber by seal rings positioned on opposing sides of the carrier and biased against the body plates. When the carrier chamber is aligned with the access opening, an annular injection groove positioned on each sealing ring communicates with respective injection passages extending through the body plates, thereby permitting a sealant to be injected into the injection groove for emergency sealing of the carrier chamber. The orifice fitting further includes a valve assembly extending through one of body plates and communicating with the carrier chamber. Extending from the valve assembly is a venting passage that permits the gas from the carrier chamber to be vented to the atmosphere at a distance from the valve assembly.

21 Claims, 7 Drawing Sheets

ORIFICE FITTING WITH VENTING PASSAGE AND INJECTION SEAL

BACKGROUND

1. The Field of the Invention

The present invention relates generally to orifice fittings using an orifice disk to measure the volume of gas passing through a pipeline. More specifically, the present invention relates to orifice fittings structured for safe removal of the orifice disk during continuous flow of the gas through the pipeline.

2. The Prior Art

Natural gas is generally sold by volumetric measurement. One way to measure the volume of a flowing gas is to pass the gas through a constricted orifice of a known size and measure the pressure drop across the orifice. An orifice fitting is an apparatus used to measure the volume of gas flowing through a pipeline by such means.

A typical orifice fitting comprises a body having a body chamber with a flow passage therethrough in communication with a gas pipeline. Positioned within the body chamber and aligned with the flow passage is an orifice disk having an orifice of a known size through which the gas flows. Pressure taps are fitted immediately upstream and downstream of the orifice for measuring the pressure drop across the orifice disk, thereby permitting calculation of the volume of flowing gas. Because the orifice is subject to wear by impacting of sand, scale, dirt, and other foreign particles in the flowing gas, the orifice disk must be replaced at frequent intervals to insure accuracy in measurement.

In more sophisticated types of orifice fittings, the orifice disk is located in a carrier which can be moved to a service position in the body chamber that is sealed off from the flow passage. The sealed chamber is referred to as the carrier chamber. Once the carrier is moved in the service position, an access opening in the wall of the body can be exposed by removal of a sealed hatch to enable service or replacement of the orifice disk without having to shut off the flow of gas through the flow passage. Such a feature is valuable to pipeline or production facilities where stopping the gas flow would halt transportation. Furthermore, for those who sell gas, the ability to replace the orifice disk without having to shut off the gas flow helps insure continuous supply.

As a result of high pressures in the gas flow pipelines, removal of the hatch to access the orifice disk can often result in serious or even catastrophic consequences if the carrier chamber is not first properly sealed from the gas flow and the gas within the carrier chamber properly vented. To relieve the pressure within the carrier chamber prior to opening the hatch, a valve passageway is provided in the body extending from the exterior of the body to the body chamber. A transfer duct is also positioned within the body and extends from the carrier chamber, when the carrier is in the service position, to the valve passageway. A valve assembly is then positioned in the valve passageway and can be selectively advanced or contracted into a first or second position.

With the valve assembly in the first position and the carrier in service position, gas communication exists between the carrier chamber and body chamber via the transfer duct and one end of the valve passageway. For removal of the orifice disk, the valve assembly is placed in the second position which closes communication between carrier chamber and body chamber but opens gas communication between the transfer duct and opposing end of the valve passageway, thereby permitting the gas within the carrier chamber to travel through the valve assembly and exit the body through the exposed end of the valve assembly.

After the gas within the carrier chamber is bled off, the hatch can be removed and the orifice disk inspected or replaced. Once a disk is replaced and the hatch again secured, the valve assembly can be placed back into the first position which permits repressurization of the carrier chamber. Repressurization of the carrier chamber permits for easy assimilation of the orifice disk back into the gas flow line.

To seal off gas communication with the body chamber as the valve assembly is moved between the first and second position, O-rings are positioned inside the valve assembly. One problem with such rings, however, as shown in U.S. Pat. No. 4,476,730 entitled "Orifice Meter With Pressure Venting and Equalizing Safety Device" issued to Richard S. Brumm on Oct. 16, 1984, is that as the valve assembly is advanced or retracted for opening the respective passages, the O-rings are removed from their adjacent external supports. In turn, the gas flowing through the passages will often dislodge the O-rings from their seat, thereby inhibiting proper seal or advancement of the valve assembly.

An additional problem with the above described valve assembly is that the gas from the carrier chamber is vented through the external end of the valve assembly at the point where the valve is manually advanced or retracted into the desired first or second position. Often the gas within the flow line is poisonous and is usually highly flammable. Accordingly, it is undesirable to have the gas vent into the face of the individual advancing or retracting the valve assembly. Thus, what is needed is an orifice fitting that permits venting of the carrier chamber at a location remote from the valve assembly and, preferably, at a location remote from the orifice fitting itself.

Furthermore, as previously discussed, to safely open the hatch that seals the access opening, the carrier chamber must be properly sealed from the pressurized gas within the body chamber. To seal the carrier chamber, O-rings are positioned to encircle the carrier chamber and to be biased between carrier chamber and the body walls of the body chamber. Over time, however, as the carrier is moved between the service position and the gas flow measuring position, the O-rings can wear, preventing a complete seal. In addition, material in the gas flow line can damage or get lodged against the O-rings, also preventing a proper seal.

Failure of the O-rings to properly seal precludes the orifice chamber from completely venting. If an O-ring fails, high pressure gas is able to pass from the flow passage into the carrier chamber, thereby precluding opening of the hatch. Under such situations, the gas flow line must be completely shut off, thereby defeating the purpose of the valve assembly and access chamber. Accordingly, what is needed is an orifice fitting that includes an alternate, back-up means for selectively sealing the carrier chamber from the body chamber upon failure of the O-rings.

BRIEF SUMMARY AND OBJECTS OF THE INVENTION

Accordingly, it is an object of the present invention to provide an orifice fitting for measuring the volume of gas through an orifice disk.

It is another object of the present invention to provide an orifice fitting having a sealed carrier chamber from which the orifice disk can be removed without shutting off the flow of gas through the orifice fitting.

Still another object of the present invention is to provide an orifice fitting having a valve assembly for selectively removing pressurized gas from the carrier chamber wherein the O-rings used in the valve assembly are continuously supported throughout their operation to prevent dislodging from their selected grooves.

Also, another object of the present invention is to provide an orifice fitting for venting the gas from the carrier chamber at a location remote from the valve assembly.

It is yet another object of the present invention to provide an orifice fitting for venting the gas from the carrier chamber at a location remote from the orifice fitting.

Furthermore, an additional object of the present invention is to provide an orifice fitting wherein the carrier chamber can be selectively sealed in the event of failure of the sealing O-rings.

To achieve the foregoing objects, and in accordance with the invention as embodied and broadly described herein, an orifice fitting capable of measuring the volume of gas passing through a pipeline is disclosed. The orifice fitting comprises a body including a pair of opposing body plates, the body plates having an interior surface and an exterior surface. Positioned within the body is a body chamber defined by the interior surface of the body plates. The body plates also have an aligned flow passage that communicates with the body chamber. Furthermore, one of the body plates includes an access opening that is selectively covered and sealed by a hatch.

A carrier is movably positioned within the body chamber and includes a carrier chamber. Removably positioned within the carrier chamber is an orifice disk having an orifice of a predetermined size. Means are provided for moving the carrier between a first position where the carrier chamber is aligned with the flow passage and a second position where the carrier chamber is aligned with the access opening. With the carrier in the first position, pressure taps located at equal distances on opposing sides of the orifice disk measure the gas pressure drop across the orifice. In turn, the pressure drop can be used to calculate the volume of gas passing through the orifice. With the carrier in the second position, the hatch can be removed to allow the orifice disk to be inspected or replaced through the access opening.

To seal the carrier chamber from the pressurized gas within the body chamber, seal rings are positioned on opposing sides of the carrier and aligned with the carrier chamber. Each of the seal rings includes a sealing face containing an annular seal groove and an annular injection groove. Each seal groove forms a seat for a seal O-ring which is in turn biased against the internal surface of the body plates, thereby sealing the carrier chamber from the body chamber.

The present invention further includes an injection passage extending from each injection groove when the carrier is in the second position to the exterior of the body plates. In one embodiment, grease fittings are attached to the exterior surface of the body plates so as to communicate with the injection passages. By injecting a sealant through the grease fittings, the sealant passes through the injection passage and into the injection groove, thereby forming an emergency seal between the carrier chamber and the body chamber.

The present invention also permits venting of the gas within the carrier chamber prior to opening of the hatch. To accomplish this, a valve passageway is positioned through one of the body plates to communicate with the body chamber. A venting passage is formed extending from the valve passageway through the one body plate and exiting to the exterior of the body at a location remote from the valve passageway. Furthermore, a transfer duct is formed extending from the carrier passage, when the carrier is in the second position, to the valve passageway.

A vent valve is positioned in the valve passageway to be selectively movable into a first position and second position. In the first position, the valve assembly seals off the venting passages and opens gas communication between the carrier chamber and the body chamber. In the second position, the valve assembly seals off gas communication between the carrier chamber and the body chamber and opens gas communication between the venting passage and transfer duct, thereby venting gas from the carrier chamber to the exterior of the orifice fitting.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity and detail through the use of the accompanying drawings in which.

DETAILED DESCRIPTION OF THE PREFERRED EMBODIMENT

Figure 1:
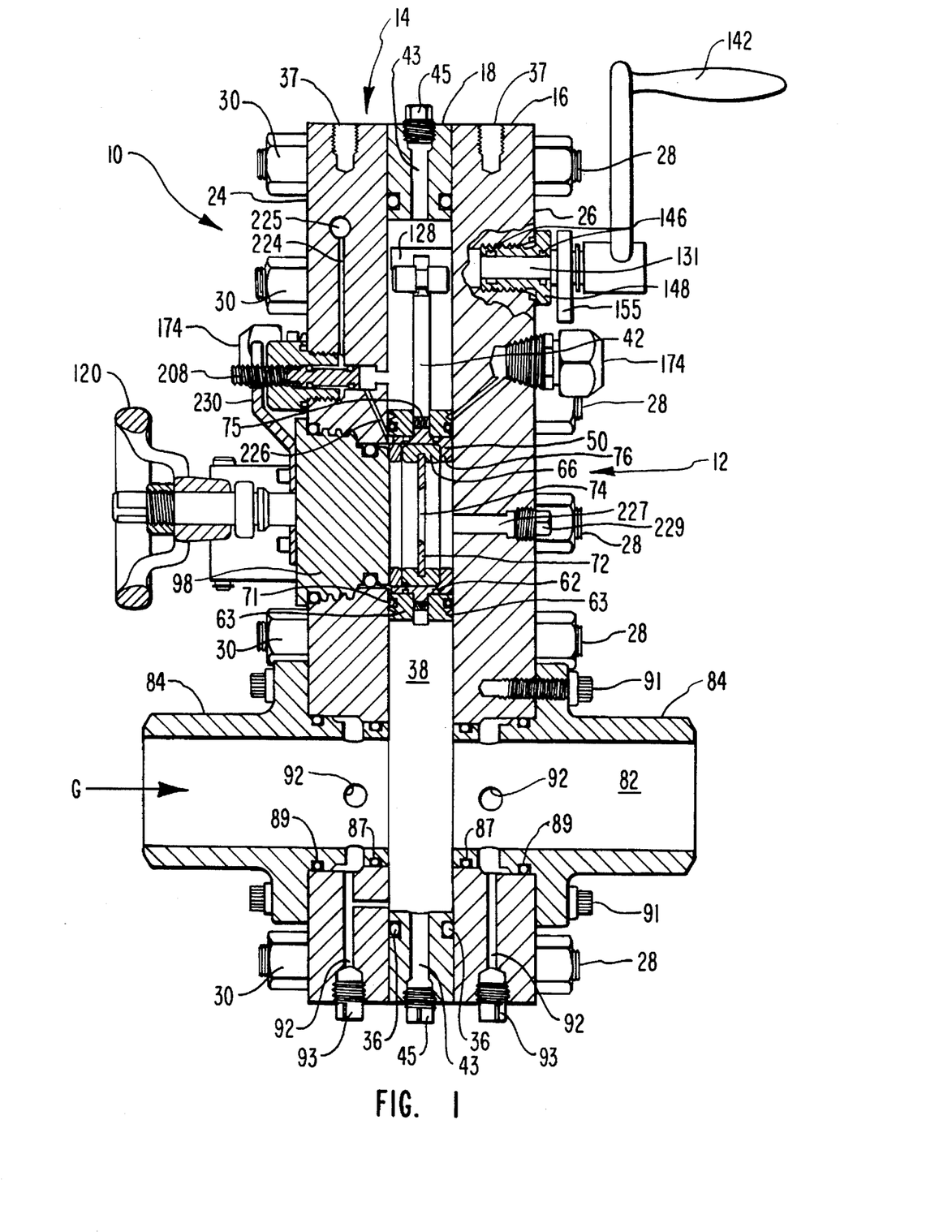
FIG. 1 is a cross-sectional view of the orifice fitting of the present invention.
Figure 2:
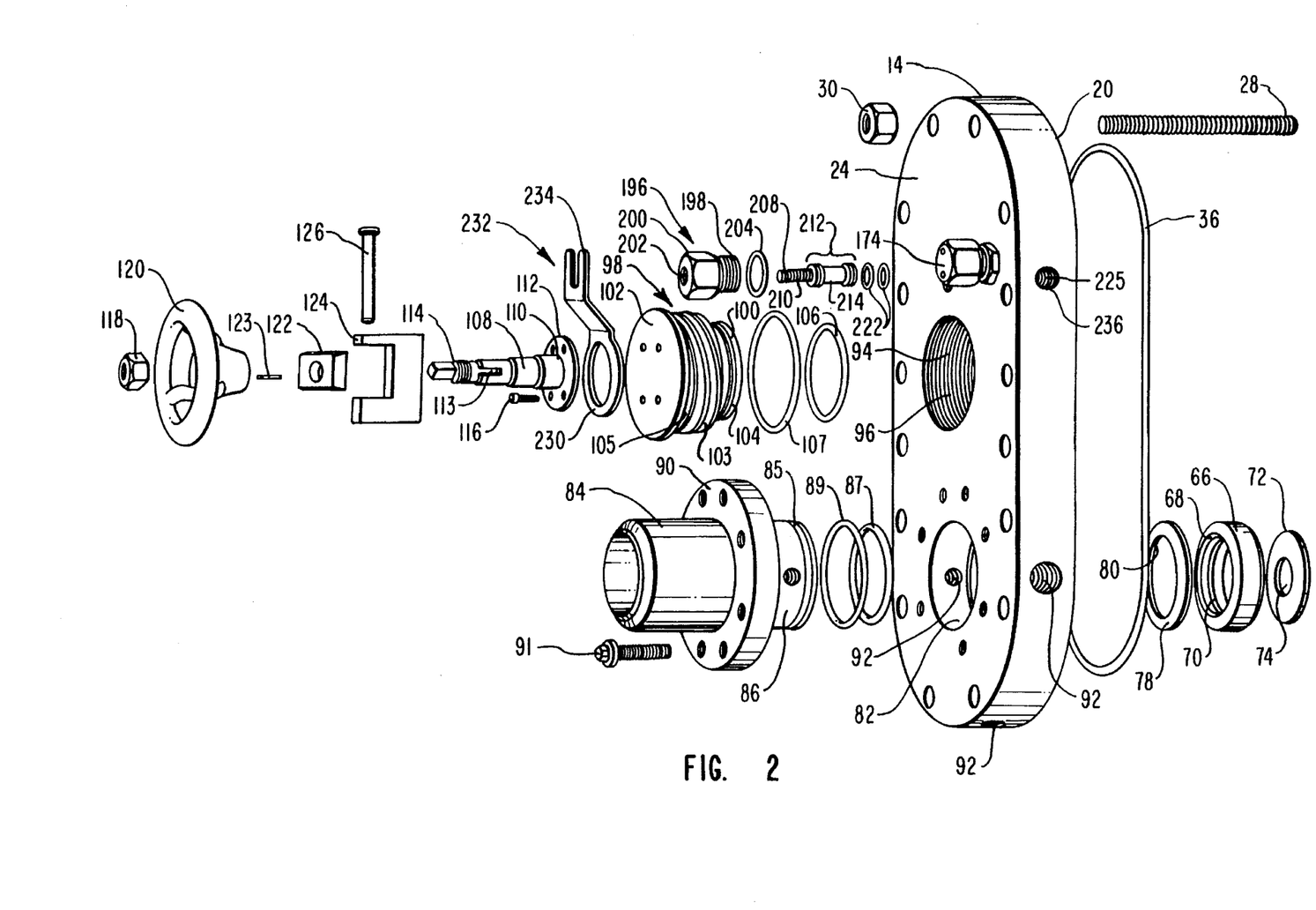
FIG. 2 is an exploded view of the upstream section of the orifice fitting of FIG. 1.
Figure 3:
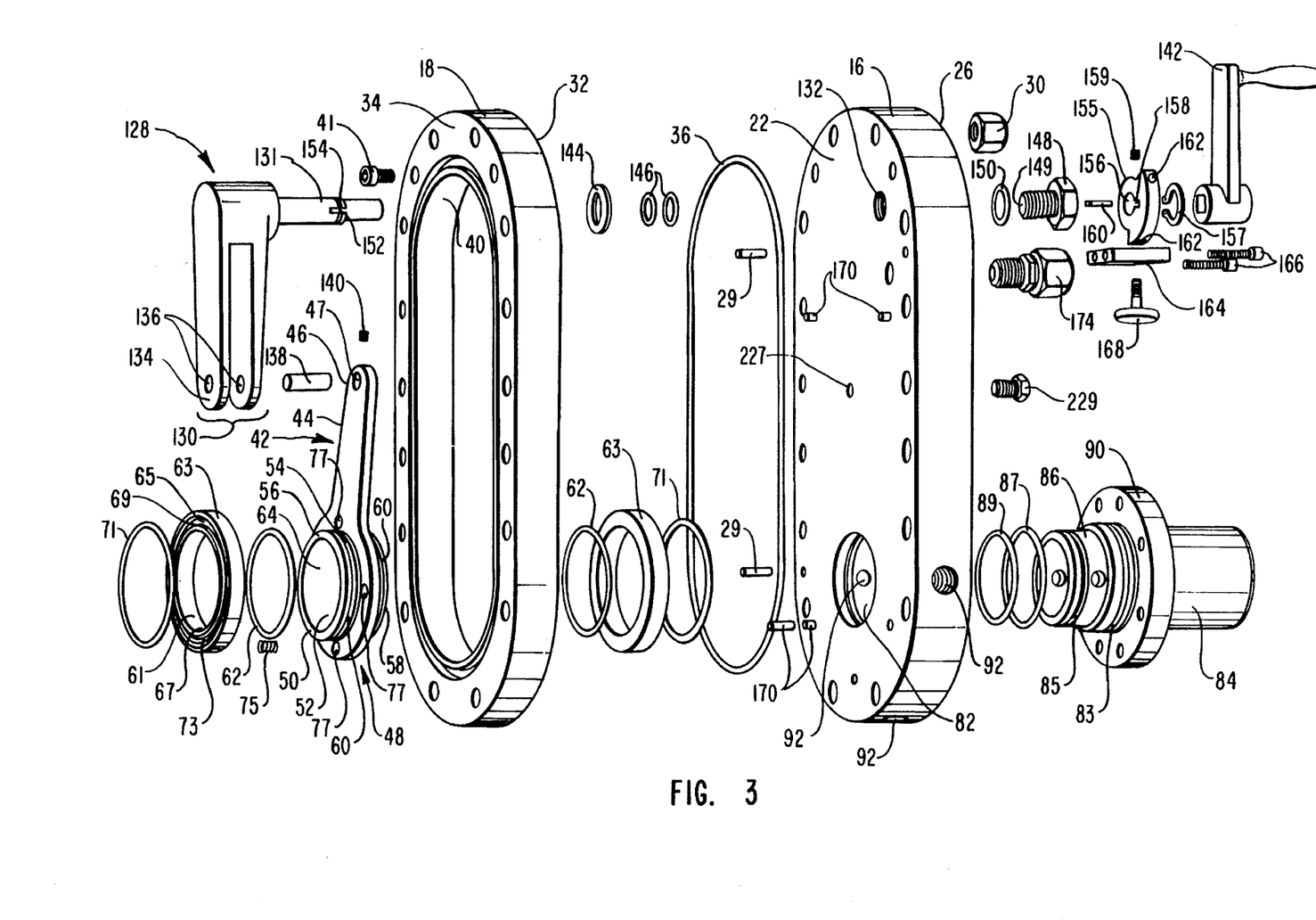
FIG. 3 is an exploded view of the downstream section of the orifice fitting of FIG. 1.

Depicted in FIG. 1 is a cross-sectional view of an orifice fitting 10 that is shown more clearly in the exploded views of FIGS. 2 and 3. Defining orifice fitting 10 is a body 12 comprising a pair of opposing body plates, including upstream body plate 14 and downstream body plate 16, and an oval body band 18. Body plates 14 and 16 each have an interior surface 20 and 22, respectively, and an exterior surface 24 and 26, respectively. Body band 18 has opposing sides 32 and 34 with an interior surface 40. Body 12 is preferably made of a carbon steel. In the alternative, body 12 can also be made of stainless steel. Stainless steel is often preferred where corrosive gases are being transported. The metal components of orifice fitting 10 that have a sealing surface are coated with an electroless nickel plating to increase hardness and corrosion resistance.

In assembly of orifice fitting 10 shown depicted in FIGS. 2 and 3, body band 18 is aligned and attached to downstream body plate 16 by cap screws 41. Upstream body plate 14 is then aligned with body band 18 so that bolts 28 with nuts 30 clamp body plates 14 and 16 to opposing sides 32 and 34 of body band 18. Body pins 29 passing through body band 18 and inserted into body plates 14 and 16 properly align body plates 14 and 16 with body band 18. Resilient seal rings 36 positioned between body band 18 and body plates 14 and 16 form a sealed body chamber 38 defined by interior surfaces 20 and 22 of body plates 14 and 16 and interior surface 40 of body band 18.

Drilled into the top of orifice fitting 10 are threaded positioning bores 37. Bolts or other articles (not shown) can be screwed into positioning bores 37 for assistance in transportation, installation, and alignment of orifice fitting 10. Furthermore, testing channels 43 are positioned at opposing ends of orifice fitting 10 and are shown in FIG. 1 as being sealed by testing plugs 45. Testing channels 43 communicate with body chamber 38 to permit selective filling or venting of body chamber 38 with a liquid for pressure testing orifice fitting 10.

Slidably positioned within body chamber 38 is a carrier 42 comprising an arm 44 terminating in a first end 46 with a pivot passage 47 therethrough. Arm 44 also has an enlarged circular second end 48 through which an annular sleeve 50 is integrally positioned. Sleeve 50 has an interior surface 52 defining a carrier chamber 64, an exterior surface 54, an upstream end 56, and a downstream end 58. Upstream end 56 and downstream end 58 are located on opposing sides of arm 44 and extend therefrom.

In accordance with the present invention there is also provided means for isolating carrier chamber 64 from body chamber 38. Annular grooves 60 positioned on exterior surface 54 near ends of 56 and 58 of sleeve 50 form seats for seat O-rings 62. Seal rings 63 having a sealing face 65 and a passage 67 defined by an interior surface 61 are circumferentially positioned about ends 56 and 58 of sleeve 50 such that seat O-rings 62 are biased against interior surface 61, thereby forming a sealed connection between sleeve 50 and seal rings 63.

Figure 4:
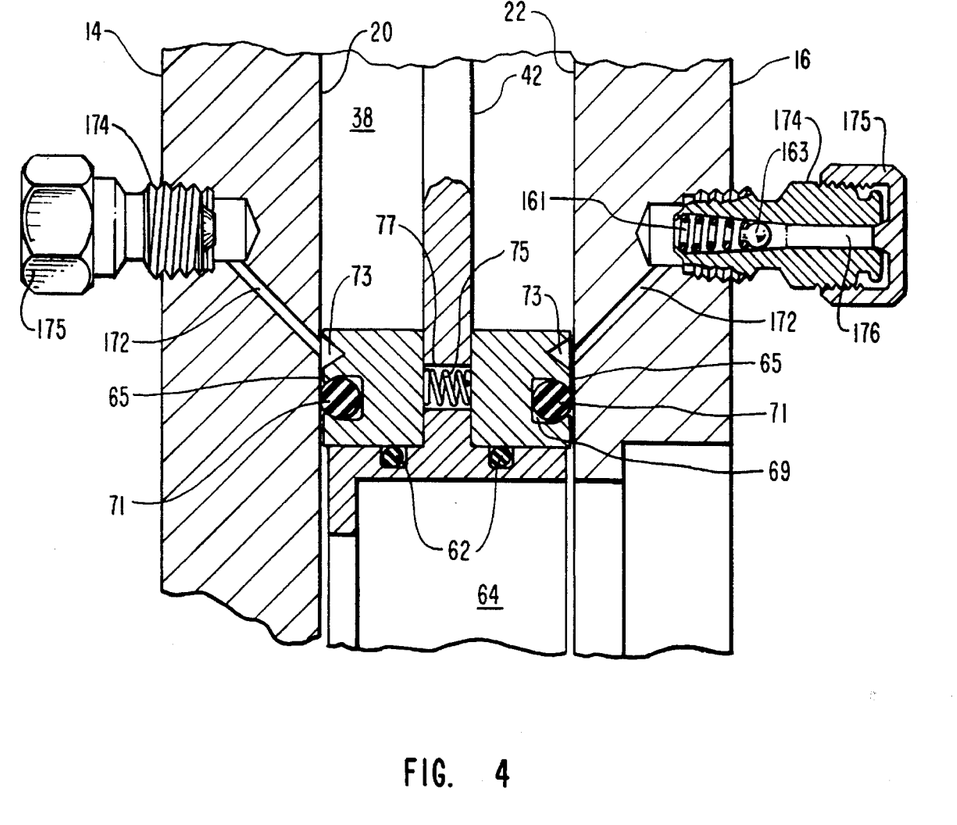
FIG. 4 is an enlarged cross-sectional view of the injection grooves and corresponding injection passages existing in the orifice fitting of the present invention.

Furthermore, as illustrated in FIG. 3 and 4, each sealing face 65 has an annular sealing groove 69 forming a seat for a seal O-ring 71. Each seal O-ring 71 is biased against a respective interior surface 20 or 22 of body plates 14 or 16 such that carrier chamber 64 is isolated or sealed from body chamber 38. To assist in keeping each seal O-ring 71 biased against interior surfaces 20 and 22, springs 75 are positioned in passages 77 extending through arm 44 at positions adjacent to sleeve 50. Springs 75 press against seal rings 63 increasing the force at which seal O-ring 71 press against internal surfaces 20 and 22 of body plates 14 and 16. Although only one spring 75 is shown on FIG. 3, springs 75 are positioned in each passage 77 in the functioning embodiment. Adjacent to sealing groove 69 on sealing face 65 is an annular injection groove 73 that will be discussed later.

Referring now to FIG. 2, removably positioned within carrier chamber 64 of annular sleeve 50 is an orifice plate seal 66 having a passage 68 with an annular groove 70 positioned therein. Removably positioned within annular groove 70 is an orifice plate 72 having an orifice 74 of a predetermined size. As best seen in FIG. 1, an annular internal shoulder 76 extending from interior surface 52 at downstream end 58 of sleeve 50 provides a stop for orifice plate seal 66 positioned within carrier chamber 64. Adjacent to orifice plate seal 66 at upstream end 56 of sleeve 50 is a spacer ring 78 having a passage 80 that has an internal diameter equal to, and is aligned with, passage 68 of orifice 18 plate seal 66.

With reference again to FIGS. 2 and 3, orifice fitting 10 of the present invention further comprises a flow passage by which gas travels in the direction of arrow G through orifice fitting 10. The flow passage includes axially aligned bores 82 passing through body plates 14 and 16 so as to communicate with body chamber 38. Axially aligned with bores 82 and rigidly attached to the exterior surfaces 24 and 26 of body plates 14 and 16 are transition tubes 84 for attachment to gas pipelines (not shown). Transition tubes 84, plate seal 66, spacer ring 78, and internal shoulder 76 of carrier chamber 64 have the same inside diameter as the attached gas pipelines so as not to obstruct the gas flow and, thereby, affect measuring of the gas flow.

Transition tubes 84 comprise a sleeve 86 inserted in bores 82 and have an outside diameter substantially complementary to the bores 82. Inner and outer annular grooves 83 and 85 positioned on sleeve 86 form seats for inner and outer transitions O-rings 87 and 89, respectively, that are biased against bores 82 to form a sealed connection between transition tubes 84 and body plates 14 and 16. Transition tubes 84 further include a flange 90 radially extending from sleeve 86. Transition tubes 84 are secured to body plates 14 and 16 by bolts 91 connecting flange 90 to body plates 14 and 16.

One of the functions of orifice fitting 10 is to measure the volume of gas traveling through a pipeline attached to transitions tubes 84. To accomplish this end, carrier chamber 64 is aligned and sealed with bores 82 such that the gas traveling through the pipeline passes through orifice 74 in orifice plate 72. Pressure taps 92 are provided at fixed distances upstream and downstream of orifice plate 72 so that the resulting pressure drop across orifice 74 can be measured. In the embodiment shown in FIGS. 2 and 3, three pairs of pressure taps 92 are provided in body plates 14 and 16 for maximum flexibility in installation of orifice fitting 10. Two pairs of pressure taps 92 are located 180 degrees apart along the horizontal center line of bores 82 in body plates 14 and 16. A third pair of pressure taps 92 extend from the base of orifice fitting 10. Plugs 93 seal off pressure taps 92 when not in use. The drop in pressure between pressure tap 92 in body plate 14 and pressure tap 92 in body 16 can be measured and used to calculate the corresponding gas flow.

Referring to FIG. 2, upstream body plate 14 also contains an access opening 94 communicating with body chamber 38 and having internal threads 96 positioned therein. Associated with access opening 94 is substantially cylindrical hatch 98 having a first end 100, a second end 102, and external threads 103 complementary to internal threads 96 of access opening 94. With hatch 98 axially aligned with access opening 94, hatch 98 can be selectively rotated to close or open access opening 94. First and second annular grooves 104 and 105 located on opposing ends of hatch 98 form seats for first and second hatch O-rings 106 and 107, respectively, that seal body chamber 38 from the outside environment when hatch 98 is closed.

To facilitate rotation of hatch 98, a substantially cylindrical hatch shaft 108 having a first end 110 with a mounting flange 112 extending therefrom and having a second end 114 is attached to second end 102 of hatch 98 by bolts 116. Secured to second end 114 of hatch shaft 108 by nut 118 is a handwheel 120, whereby rotation of handwheel 120 rotates hatch 98. A key 123 positioned in slot 113 of hatch shaft 108 aligns handwheel 120 and insures complementary rotation of handwheel 120 and hatch shaft 108. Positioned about hatch shaft 108 is closure arm 122 that is pivotally connected to a hinge 124 by a pin 126. Hinge 124 is mounted on upstream body plate 14 so that as hatch 98 is opened, hatch 98 can be selectively rotated away from access opening 94.

In accordance with the present invention, there is also provided means for moving carrier 42 between a first position wherein the carrier chamber 64 is aligned with bores 82 and a second position wherein carrier chamber 64 is aligned with access opening 94. By way of example and not by limitation there is shown in FIG. 3 a crank shaft 128. Crank shaft 128 comprises lifting forks 130 positioned in body chamber 38 and a rotation shaft 131 perpendicular to lifting fork 130 and extending through downstream body plate 16 via a crank passage 132. Lifting forks 130 terminate in a pivot end 134 having a passage 136 extending therethrough. First end 46 of carrier 42 is hingedly connected to pivot end 134 of lifting forks 130 by aligning pivot passage 47 with passage 136 and having a crank pin 138 positioned therethrough. Crank pin 138 is connected to carrier 42 by a carrier pin set screw 140.

A handle 142 attached to the projecting end of rotation shaft 131 can then be selectively rotated so as to rotate lifting forks 130, thereby selectively raising or lowering carrier 42 within body chamber 38. A thrust bushing 144 is positioned about rotation shaft 131 and against lifting forks 130 to provide a smooth surface for rotation. To prevent gas from escaping through crank passage 132, a crank bushing 148 is screwed into crank passage 132 from exterior surface 26 of downstream body plate 16 securing bushing O-ring 150 between crank bushing 148 and exterior surface 26. Crank bushing 148 includes a passage 149 through which rotation shaft 131 is disposed. As shown in FIG. 1, a pair of shaft O-rings 146 are positioned in grooves at opposing ends of the interior of passage 149. Shaft O-rings 146 are biased between rotation shaft 131 and the interior of passage 149 so as to seal crank passage 132.

To prevent accidental rotation of handle 142, crank shaft 128 is constructed with a key slot 152 longitudinally aligned with crank shaft 128 and an annular groove 154 intersecting key slot 152. Positioned about key slot 152 is a detent plate 155 having an axially aligned passage 156 including a key groove 158, such that as key slot 152 and key groove 158 are aligned, a key 160 can be inserted therein so as to insure complementary rotation of crank shaft 128 and detent plate 155. Detent plate 155 is held on crank shaft 128 by crank snap ring 157 inserted in annular groove 154 and a detent plate set screw 159 screwed into detent plate 155. Detent plate 155 further comprises a pair of positioning bores 162 radially extending from detent plate 155 and being a distance apart.

A detent bracket 164 is positioned adjacent to detent plate 155 and is anchored to exterior surface 26 of downstream body plate 16 by a pair of bolts 166. Bisecting detent bracket 164 and aligned with positioning bores 162 is a positioning pin 168 that can be selectively advanced or retracted to be inserted into one of the positioning bores 162 depending on whether carrier 42 is in the first or second position. In the preferred embodiment, a spring (not shown) is attached to positioning pin 168 so as to continually urge positioning pin 168 against detent plate 155. By inserting position pin 168 into one of positioning bores 162, handle 142 is prevented from rotating, thereby preventing accidental movement of carrier 42.

To insure that carrier chamber 64 is properly aligned in the first and second position, a plurality of internal stops 170 span between interior surface 20 of the upstream body plate 14 and interior surface 22 of the downstream body plate 16. Internal stops 170 are selectively positioned to brace against sealing rings 63 when carrier chamber 64 reaches proper alignment.

One of the features of orifice fitting 10 is the ability to remove orifice plate 72 from carrier chamber 64 while gas is traveling through the flow passage and within body chamber 38. Removal of orifice plate 72 is accomplished by placing carrier 44 in the second position and opening hatch 98 such that orifice plate seal 66 can be removed through access opening 94. However, prior to opening hatch 98, gas within carrier chamber 64 must be properly vented and carrier chamber 64 must be properly sealed from body chamber 38.

As previously discussed, carrier chamber 64 is sealed from body chamber 38 by seal O-rings 71 being biased between seal rings 63 and the interior surfaces 20 and 22 of body plates 14 and 16. This seal remains constant as carrier 44 is moved between the first and second position. Over time, as carrier 44 is moved for inspection and replacement of orifice plate 72, seal O-rings 71 can wear, preventing complete sealing from body chamber 38. Furthermore, it is also possible for particulate matter from the gas flow stream to get caught under seal O-rings 71 and prevent sealing.

Depicted in FIG. 4 is a cross section view of a portion of seal rings 63 showing injection groove 73 that is annularly disposed about sealing face 65. Injection of a sealant within injection groove 73 forms a seal that precludes gas from entering the carrier chamber 64 from body chamber 38 during failure of seal O-rings 71. The type of sealant used typically varies depending on the temperature of the gas and the type of gas being measured. Selection of the proper sealant can be made by those skilled in the art and can be purchased from companies such as Sealweld of Calgary, Alberta, Canada.

To permit injection of the sealant, an injection passage 172 is formed extending from each exterior surface 24 and 26 of body plates 14 and 16 to each injection groove 73 when carrier 42 is in the second position.

In accordance with the present invention, there is also provided means for positioning and maintaining a sealant under pressure in each injection passage 172 and injection groove 73. By way of example and not by limitation there is shown in FIG. 4 conventional button head grease fittings 174 having protective caps 175. Grease fittings 174 are attached to the exterior surfaces 22 and 24 of body plates 14 and 16 and are in communication with each injection passage 172. Each grease fitting 174 has a port 176 to permit a one way injection of a sealant. Once the sealant is injected, a spring 161 urges a ball bearing 163 within port 176 so as to prevent the sealant from escaping, thereby holding the sealant under pressure. The sealant can be injected by a conventional grease gun (not shown). In alternative embodiments, means for positioning and maintaining a sealant under pressure includes any one of a variety of conventional injection grease fittings or stem injectors.

Figure 5:
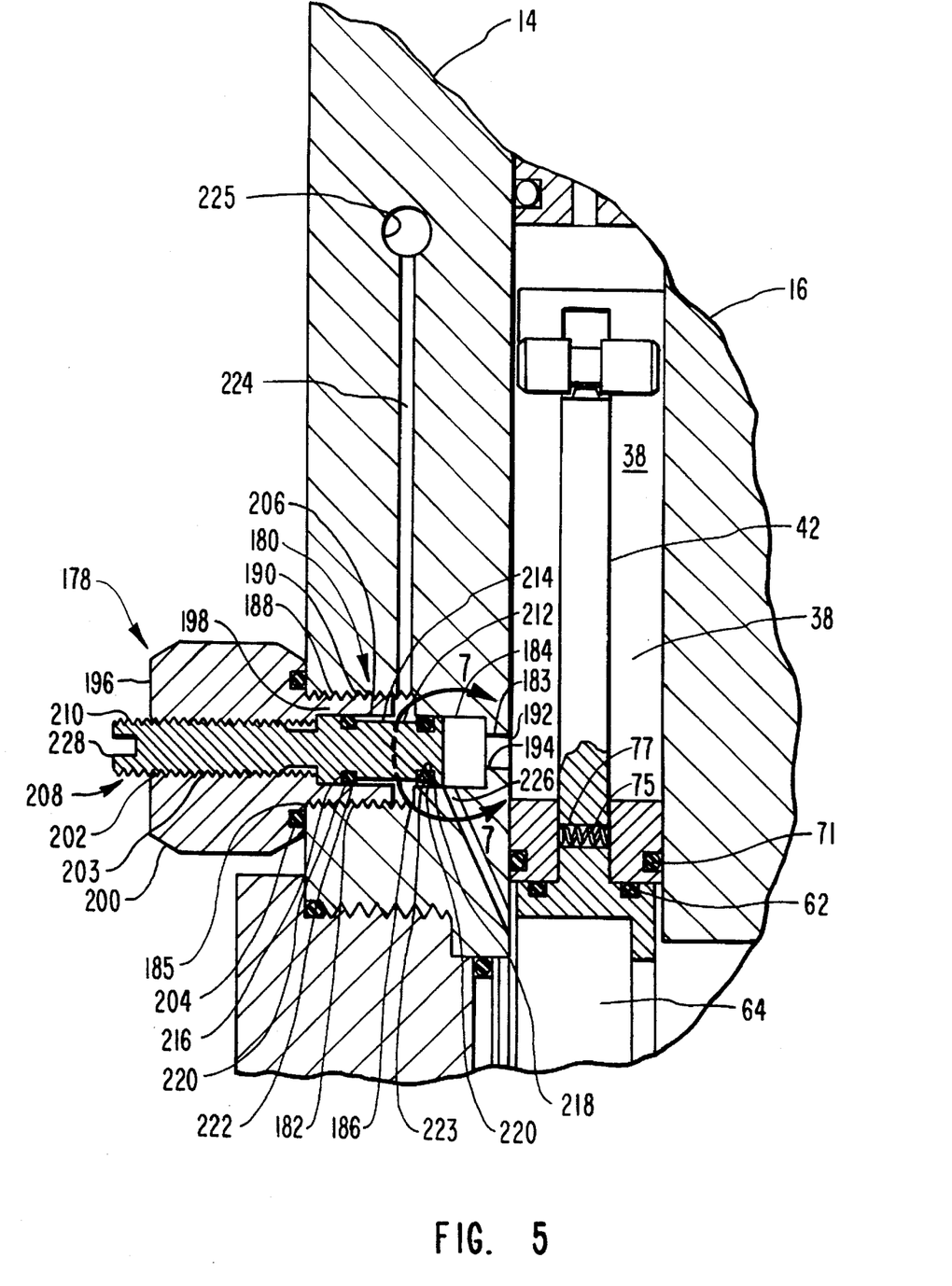
FIG. 5 is an enlarged cross-sectional view of the vent valve assembly of the present invention in the first position.

In one aspect of the present invention, as depicted in FIG. 5, a valve assembly 178 disposed within a valve passageway 180 extending through upstream body plate 14 is provided for removing gas from carrier chamber 64 prior to opening hatch 98. Valve passageway 180 comprises a coaxially aligned first bore 182, second bore 183, and third bore 184. First bore 182 includes a port 185 positioned on exterior surface 24 of upstream body plate 14, an interior end 186 positioned within upstream body plate 14, and an interior surface 188 with threads 190 positioned thereon. Second bore 183 is reduced in size with respect to first bore 182 and extends from a port 192 positioned at interior surface 20 of upstream body plate 14 to an interior end 194 positioned within upstream body plate 14. Finally, third bore 184 is coaxially aligned with first bore 182 and second bore 183 and extends from interior end 186 of first bore 182 to interior end 194 of second bore 183.

Valve assembly 178 comprises a vent valve body 196 and a substantially cylindrical valve spool 208 longitudinally disposed therein. Vent valve body 196 includes an enlarged end cap 200, a threaded end 198, and a duct 202 longitudinally passing through vent valve body 196. Threaded end 198 is configured to engage threads 190 in first bore 182. Duct 202 is aligned with third bore 184 and comprises an axially aligned threaded passage 203 positioned within end cap 200 and a smooth passage 199 positioned within threaded end 198. Threaded passage 203 has a smaller inside diameter than smooth passage 199, thereby creating an annular shoulder 201 defining the transition between threaded passage 203 and smooth passage 199. A valve body O-ring 204, positioned between end cap 200 of vent valve body 196 and exterior surface 24 of upstream plate 14, forms a sealed connection. The combination of smooth passage 199 and third bore 184 define a valve bore 206 having a substantially uniform diameter and smooth inner profile.

Selectively moveable within valve bore 206 is vent valve spool 208. Spool 208 comprises a threaded first end 210 for engaging attachment with threaded passage 203 and a second end 212 including an annular elongated groove 214 disposed thereon. The outside diameter of second end 212 is larger than the outside diameter of first end 210 so that an annular shoulder 213 is formed at the transition between first end 210 and second end 212. Elongated groove 214 has a first end 216 and a second end 218 with annular seal grooves 220 disposed thereat. Grooves 220 form seats for first spool O-ring 222 positioned at first end 216 and second spool O-ring 223 positioned at second end 218.

Communicating with valve bore 206 is venting passage 224 extending from first bore 182 through downstream body plate 16 and exiting to the exterior of downstream body plate 16 through exhaust port 225 at a distance from valve passageway 180. Also communicating with valve bore 206 is transfer duct 226 extending from carrier chamber 64 when carrier 42 is in the second position to third bore 184. Transfer duct 226 communicates with third bore 184 through an opening 231.

A recessed socket 228 positioned at first end 210 of vent valve spool 208 permits attachment of a wrench (not shown) for selective advancement of vent valve spool 208 into either a first or second position.

In the first position, as shown in FIG. 5, vent valve spool 208 is retracted so that shoulder 213 of valve spool 208 and shoulder 201 of valve passage 180 are in contact, thereby allowing gas communication between carrier chamber 64 and body chamber 38 through transfer duct 226, valve bore 206, and second bore 183. Shoulders 213 and 201 are positioned to prevent valve spool 208 from being retracted so far that spool O-ring 223 enters venting passage 224. This feature is important since the transition of spool O-ring 223 into and out of venting passage 224 could damage spool O-ring 223.

In one embodiment, as shown in FIGS. 1 and 2, a safety arm 230 is attached to hatch 98 and has a first end 232 with forks 234 that are positioned on adjacent sides of duct 202 of vent valve body 196. Accordingly, when vent valve spool 208 is located in the first position, first end 210 of vent valve spool 208 extends between forks 234 preventing opening of hatch 98 until vent valve spool 208 is advance to the second position. This prevents opening of hatch 98 while carrier chamber 64 is still under pressure.

Figure 6:
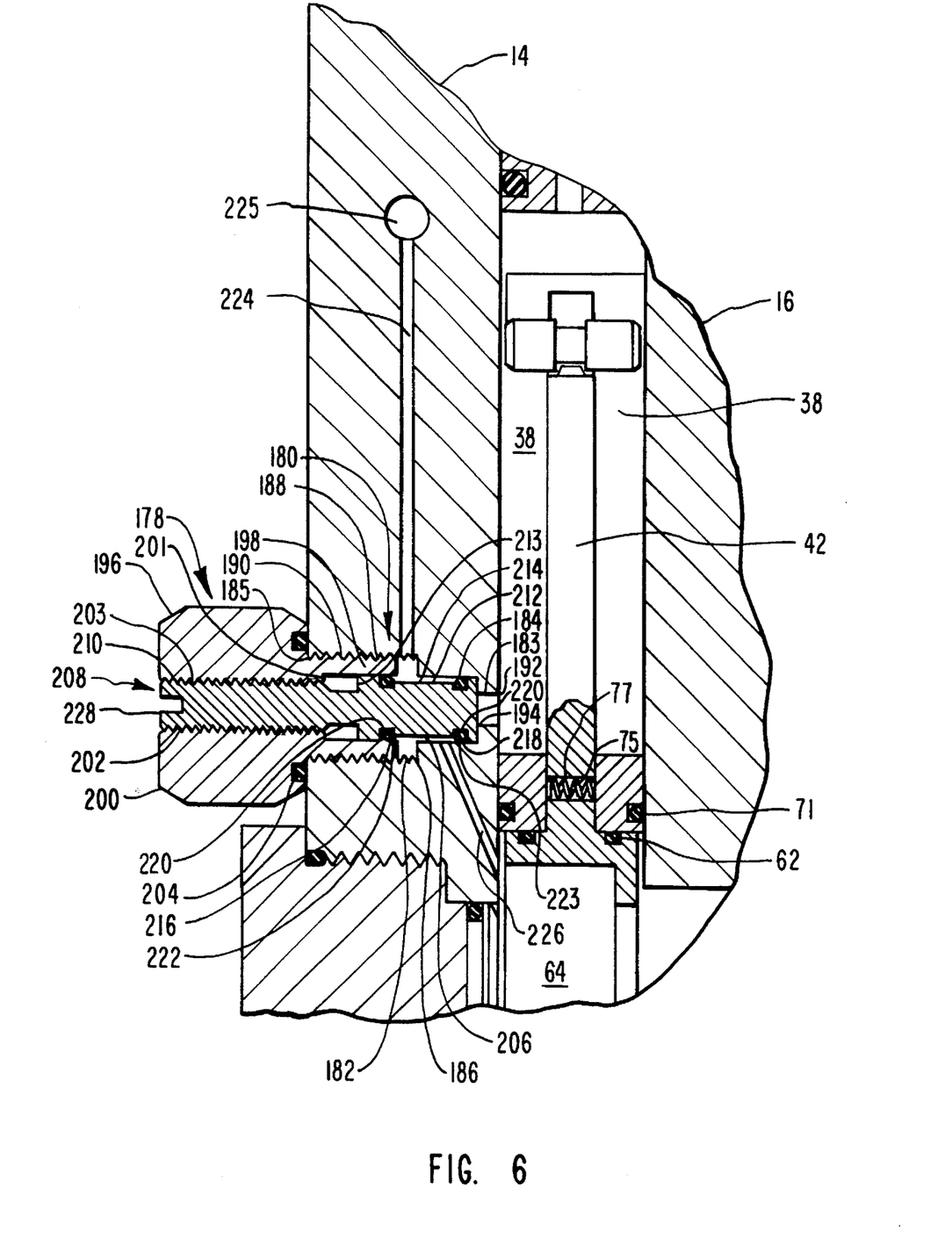
FIG. 6 is an enlarged cross-sectional view of the vent valve assembly of the present invention in the second position.

Depicted in FIG. 6, vent valve spool 208 is positioned in the second position so that spool O-rings 222 and 223 seal gas communication between carrier chamber 64 and body chamber 38 while simultaneously opening gas communication between transfer duct 226 and venting passage 224 through elongated groove 214 on vent valve spool 208. With vent valve spool 208 in the second position, carrier chamber 64 can be vented to the exterior of orifice fitting 10 through exhaust port 225, thereby permitting opening of hatch 98.

In the embodiment shown in FIG. 1, a gauge bore 227 sealed by removable plug 229 is drilled through downstream body plate 16 so as to communicate with carrier chamber 64 when carrier 42 is in the second position. A pressure gauge (not shown) can be attached to gauge bore 227 to insure that the gas within carrier chamber 64 is fully vented prior to opening hatch 98. Gauge bore 227 also functions as an access for assistance in removing orifice plate 72.

As depicted in FIGS. 5 and 6, spool O-rings 222 and 223 are positioned so as to be continually biased against valve bore 206 as vent valve spool 208 is advanced between first and second position. Such positioning prevents spool O-rings 222 and 223 from becoming displaced or damaged during transition of vent valve spool 208 or venting of the gas.

Figure 7:
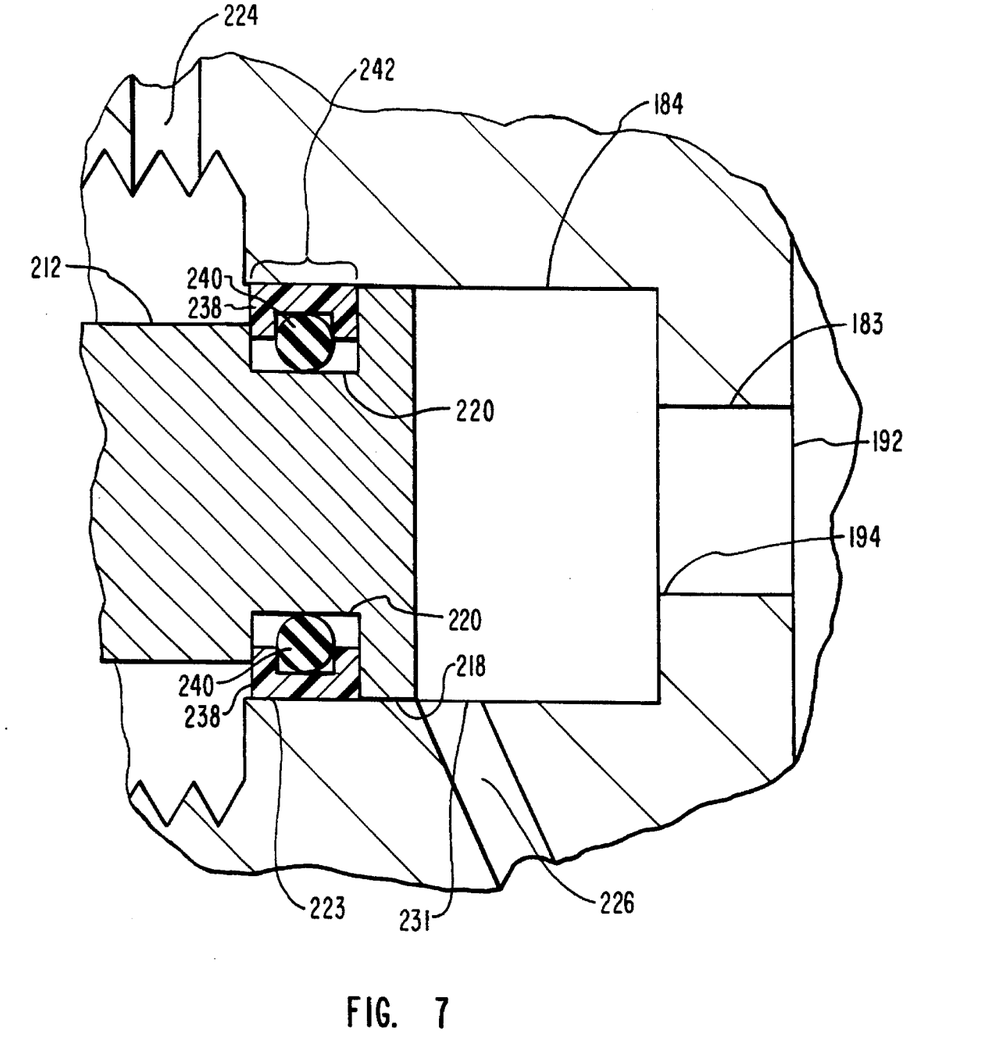
FIG. 7 is an enlarged cross-sectional view of a portion of the vent value assembly as shown in FIG. 5.

As shown in FIG. 7, to further protect spool O-ring 223 from being damaged during transition between the first and second position, spool O-ring 223 preferably comprises a rigid O-ring 238 having an inner annular groove that forms a seat for a conventional seal O-ring 240. Seal O-ring 240 is biased against vent valve spool 208 and urges rigid O-ring 238 against valve bore 206 so as to seal valve bore 206. Rigid O-ring 238 also has a rectangular cross section with a width 242 that is larger than the effective diameter of opening 231 of transfer duct 226. Accordingly, as vent valve spool 208 is transferred between the first and second position, rigid O-ring 238 is able to span and pass over opening 231 without being damaged by opening 231.

In contrast, a conventional rubber O-ring will expand into opening 231 so that as the rubber O-ring passes over opening 231 a portion of the rubber O-ring will rub against the edge of opening 231 eventually damaging the O-ring. Rigid O-ring 238 is preferably made of teflon but can be made of any material that will form a seal with valve bore 206 and not detrimentally extend into opening 231 during transition of valve spool 208.

In accordance with the present invention, there is also provided means for securing a venting hose (not shown) to the venting passage 224. A venting hose permits the gas in carrier chamber 64 to be vented sufficiently far away from orifice fitting 10 so as not to be a danger to the individual venting the gas. By way of example and not by limitation, there is shown in FIG. 2 exhaust port 225 having threads 236 for attaching a venting hose having a complementary threaded end. Alternative means for securing a venting hose include conventional fittings such as latches and sockets.

As previously discussed, exhaust port 225, and thus the means for securing the venting hose, is located at a distance away from valve assembly 178. In the preferred embodiment, exhaust port 225 is positioned sufficiently far away from valve assembly 178 that attachment of venting hose will not interfere with the positioning of valve spool 208 into its first or second position. Furthermore, where no venting hose is used, it is preferable to have exhaust port 225 positioned so that the venting gas does not blow into the face of the individual venting carrier chamber 64. By way of example, as shown in FIG. 2, exhaust port 225 exits through the side of upstream body plate 14.

Once the gas has been removed from carrier chamber 64, orifice plate 72 can be inspected and replaced if necessary through access opening 94. After access opening 94 has again been sealed, vent valve spool 208 is again retracted to its first position so as to permit carrier chamber 64 to be repressurized by gas in body chamber 38. Having an equalized pressure between body chamber 38 and carrier chamber 64 permits easier insertion of carrier chamber 64 back into the gas flow stream.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An orifice fitting comprising:
   (a) a body having a body chamber and including a pair of opposing body plates, the body plates having an aligned flow passage therethrough;
   (b) a carrier movably positioned within the body chamber between the pair of opposing body plates and having a carrier chamber;
   (c) an orifice disk removably positioned in the carrier chamber;
   (d) an access opening through one of the body plates to the body chamber, the access opening being selectively covered and sealed by a hatch;
   (e) means for moving the carrier between a first position wherein the carrier chamber is aligned with the flow passage and a second position wherein the carrier passage is aligned with the access opening;
   (f) a pair of seal rings each positioned on opposing sides of the carrier and aligned with the carrier chamber so as to be disposed at opposing sides of the orifice disk, each of the seal rings having a sealing face biased against one of the body plates, an annular injection groove disposed on a portion of the sealing face, and means for isolating the carrier chamber from the body chamber;
   (g) an injection passage extending from each of the injection grooves when the carrier is in the second position to the exterior of the body; and
   (h) means for positioning and maintaining a sealant under pressure in the injection passages and the injection grooves, whereby the sealant assists in sealing the carrier chamber from the body chamber.

2. An orifice fitting as defined in claim 1, wherein the means for isolating the carrier chamber from the body chamber when the carrier is in the second position comprises an annular seal groove on each sealing face of the seal rings and seal O-rings disposed in the seal grooves so that a portion of the seal O-rings are biased against the body plates, thereby isolating the carrier chamber from the body chamber.

3. An orifice fitting as defined in claim 2, wherein the means for sealing the carrier chamber from the body chamber further comprises at least one spring biased against the seal rings to urge the seal O-rings against the body plates.

4. An orifice fitting as defined in claim 1, wherein the means for positioning and maintaining a sealant under pressure comprises a button head grease fitting mounted on the body plates and in communication with the injection passage.

5. An orifice fitting comprising:
   (a) a body including a pair of opposing body plates, the body plates having an interior surface and an exterior surface, the interior surface defining a body chamber positioned within the body, the body plates also having an aligned flow passage therethrough;
   (b) a carrier movably positioned within the body chamber between the pair of opposing body plates and having a carrier chamber;
   (c) an orifice disk removably positioned in the carrier chamber;
   (d) an access opening through one of the body plates to the body chamber, the access opening being selectively covered and sealed by a hatch;
   (e) means for moving the carrier between a first position wherein the carrier chamber is aligned with the flow passage and a second position wherein the carrier chamber is aligned with the access opening;
   (f) a valve passageway extending through one body plate to the body chamber;
   (g) a venting passage extending from the valve passageway through the one body plate and exiting to the exterior of the body at a distance from the valve passageway;
   (h) a transfer duct extending from the carrier chamber when the carrier is in the second position to the valve passageway; and
   (i) a valve assembly selectively moveable in the valve passageway and operative in a first position to seal off the venting passage and open communication between the body chamber and the carrier chamber through the transfer duct, and in a second position to seal off the body chamber and open communication between the venting passage and the carrier chamber through the transfer duct, the venting passage exiting through the exterior of the body through one of the body plates at a distance from the valve assembly.

6. An orifice fitting as defined in claim 5, wherein the valve passageway comprises:
   (a) a first bore forming an opening from the inner surface of one body plate, the first bore having an interior end positioned within the body plate;
   (b) a second bore enlarged and coaxially aligned with the first bore opening from the outer surface of the body plate, the second bore having an interior end positioned within the body plate; and
   (c) a third bore coaxially aligned with the first bore and the second bore and extending from the interior end of the first bore to the interior end of the second bore.

7. An orifice fitting as defined in claim 6, wherein the valve assembly comprises:
   (a) a vent valve body secured in the second bore and having a duct aligned with the third bore, the combination of the duct and third bore defining a valve bore having a substantially uniform diameter;
   (b) a substantially cylindrical valve spool movable axially in the valve bore; and
   (c) a first and second spool O-ring separated by a distance and encircling the valve spool, the first and second spool O-ring positioned to be continually biased between the valve spool and the valve bore as the valve spool is selectively moved from the first position to the second position, the second spool O-ring sealing the venting passage from the body chamber and the transfer duct with the valve spool in the first position, the first and the second spool O-rings providing sealed communication between the transfer duct and the vent passage with the valve spool in the second position.

8. An orifice fitting as defined in claim 6, wherein the second spool O-ring comprises a rigid O-ring with an annular seal O-ring positioned within, the rigid O-ring having a width of a size sufficient to span the transfer duct.

9. An orifice fitting as defined in claim 5, wherein the orifice fitting further comprises means for securing a venting hose to the venting passage where the venting passage exits the body, thereby permitting a sealed communication between the venting passage and the venting hose.

10. An orifice fitting as defined in claim 9, wherein the means for securing the venting hose comprises a threaded, exhaust port aligned with the venting passage at the exterior surface of the body plate.

11. An orifice fitting as defined in claim 5, wherein the one body plate has a side through which the venting passage exits.

12. An orifice fining comprising:
   (a) a body including a pair of opposing body plates, the body plates having an interior surface and an exterior surface, the interior surface defining a body chamber positioned within the body, the body plates also having an aligned flow passage therethrough;
   (b) a carrier movably positioned within the body chamber between the pair of opposing body plates and having a carrier chamber;
   (c) an orifice disk moveable positioned in the carrier chamber;
   (d) an access opening through one of the body plates to the body chamber, the access opening being selectively covered and sealed by a hatch;
   (e) means for moving the carrier between a first position wherein the carrier chamber is aligned with the flow passage and a second position wherein the carrier chamber is aligned with the access opening;
   (f) a pair of seal rings positioned on opposing sides of the carrier and aligned with the carrier chamber so as to be disposed at opposing sides of the orifice disk, each of the seal rings having a sealing face biased against one of the body plates, an annular injection groove disposed on a portion of the sealing face, and means for isolating the carrier chamber from the body chamber;
   (g) an injection passage extending from each of the injection grooves when the carrier is in the second position to the exterior of the body;
   (h) means for positioning and maintaining a sealant under pressure in the injection passages and the injection grooves, whereby the sealant assists in sealing the carrier chamber from the body chamber;
   (i) a valve passageway through the one body plate to the body chamber;
   (j) a venting passage extending from the valve passageway through the one body plate and exiting to the exterior of the body at a distance from the valve passageway;
   (k) a transfer duct extending from the carrier chamber when the carrier is in the second position to the valve passageway; and
   (l) a valve assembly selectively moveable in the valve passageway and operative in a first position to seal off the venting passage and open communication between the body chamber and the transfer duct, and in a second position to seal off the body chamber and open communication between the venting passage and the transfer duct.

13. An orifice fitting as defined in claim 12, wherein the means for isolating the carrier chamber from the body chamber when the carrier is in the second position comprises an annular seal groove on each sealing face of the seal rings and seal O-rings disposed in the seal grooves so that a portion of the seal O-rings are biased against the body plates, thereby isolating the carrier chamber from the body chamber.

14. An orifice fitting as defined in claim 13, wherein the means for sealing the carrier chamber from the body chamber further comprises at least one spring biased against the seal rings to urge the seal O-rings against the body plates.

15. An orifice fitting as defined in claim 12, wherein the means for positioning and maintaining a sealant under pressure comprises a button head grease fitting mounted on the body plates and in communication with the injection passage.

16. An orifice fitting as defined in claim 12, wherein the valve passageway comprises:
   (a) a first bore forming an opening from the inner surface of one body plate, the first bore having an interior end positioned within the body plate;
   (b) a second bore enlarged and coaxially aligned with the first bore opening from the outer surface of the body plate, the second bore having an interior end positioned within the body plate; and
   (c) a third bore coaxially aligned with the first bore and the second bore and extending from the interior end of the first bore to the interior end of the second bore.

17. An orifice fitting as defined in claim 16, wherein the valve assembly comprises:
   (a) a vent valve body secured in the second bore and having a duct aligned with the third bore, the combination of the duct and third bore defining a valve bore having a substantially uniform diameter;
   (b) a substantially cylindrical valve spool movable axially in the valve bore; and
   (c) a first and second spool O-ring separated by a distance and encircling the valve spool, the first and second spool O-ring positioned to be continually biased between the valve spool and the valve bore as the valve spool is selectively moved from the first position to the second position, the second spool O-ring sealing the venting passage from the body chamber and the transfer duct with the valve spool in the first position, the first and the second seal spool O-rings providing sealed communication between the transfer duct and the vent passage with the valve spool in the second position.

18. An orifice fitting as defined in claim 17, wherein the second spool O-ring comprises a rigid O-ring with an annular seal O-ring positioned within, the rigid O-ring having a width of a size sufficient to span the transfer duct.

19. An orifice fitting as defined in claim 12, wherein the orifice fitting further comprises means for securing a venting hose to the venting passage where the venting passage exits the body, thereby permitting a sealed communication between the venting passage and the venting hose.

20. An orifice fitting as defined in claim 19, wherein the means for securing the venting hose comprises a threaded, exhaust port aligned with the venting passage at the exterior surface of the body plate.

21. An orifice fitting as defined in claim 12, wherein the body plate has a side through which the venting passage exits.

* * * * *